P. HAAS.
FLUSHING VALVE.
APPLICATION FILED JULY 18, 1914.
1,143,384.
Patented June 15, 1915.
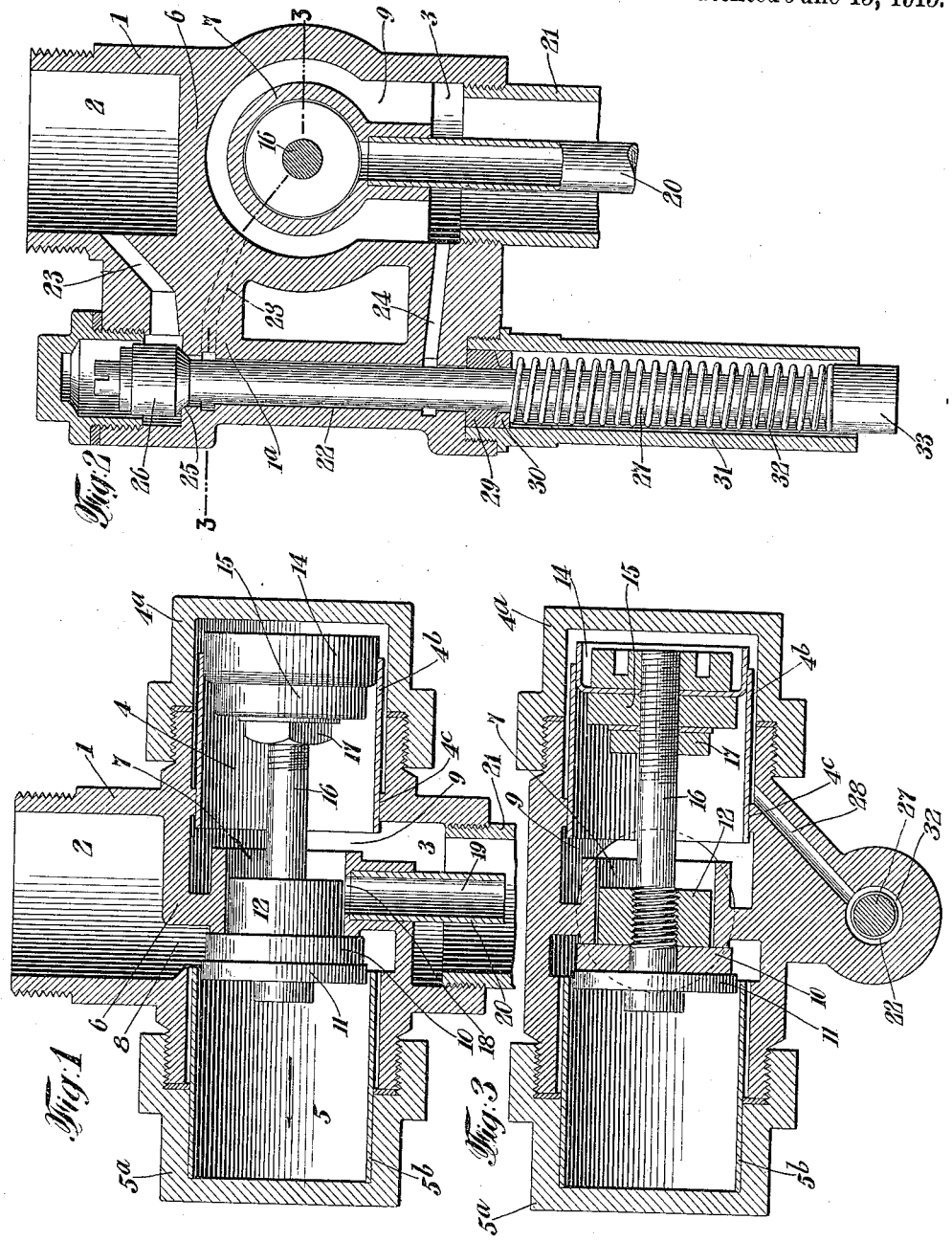
WITNESSES
John E. Prager
A. Worden Gibbs
Philip Haas INVENTOR
BY
Whitaker Prevost ATTORNEYS

UNITED STATES PATENT OFFICE.

PHILIP HAAS, OF DAYTON, OHIO.

FLUSHING-VALVE.

1,143,384. Specification of Letters Patent. Patented June 15, 1915.

Original application filed July 19, 1912, Serial No. 710,507. Divided and this application filed July 18, 1914.
Serial No. 851,695.

*To all whom it may concern:*

Be it known that I, PHILIP HAAS, a citizen of the United States, residing at Dayton, in the county of Montgomery and State of Ohio, have invented certain new and useful Improvements in Flushing-Valves; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one embodiment of my invention selected by me for purposes of illustration, and the said invention is fully disclosed in the following description and claims.

Referring to the said drawing, Figure 1 represents a vertical sectional view of a valve mechanism embodying my invention. Fig. 2 is a vertical transverse sectional view of the same. Fig. 3 represents a horizontal sectional view taken on the dotted line 3—3 of Fig. 2.

This application is a division of my former application No. 710,507 filed July 19th, 1912, upon which Letters Patent of the United States #1,111,746 were granted Sept. 29, 1914.

The valve casing or body 1 of the valve comprises an inlet chamber 2 in the upper part of the same, an outlet chamber 3 in the lower part, and centrally disposed chamber 4, and guiding chamber 5, which are in axial alinement and are separated by means of a central partition 6 which is provided with a cylindrical aperture or passage 7 having its axis coincident with the axes of the chambers 4 and 5. For convenience of manufacture, the outer end portions of the chambers 4 and 5 are formed by detachable closed caps 4ᵃ and 5ᵃ which are screwed upon threaded portions of the valve body 1 suitable packings being interposed to secure tightness of the joints, and to avoid the necessity of accurately boring these caps and the joining portions of the main body. I provide each of these chambers with a cylindrical lining 4ᵇ and 5ᵇ respectively, the lining 4ᵇ being pressed into a bored aperture 4ᶜ at the inner end of the pressure chamber and the lining 5ᵇ being pressed into a bored portion of the cap 5ᵃ. The inlet chamber 2 communicates by a passage 8 with the guiding chamber 5 at one side of the partition 6 and the outlet chamber 3 communicates by a passage 9 with the inner end of the pressure chamber on the other side of the partition.

At the inner end of the guiding chamber I provide a normally closed inlet valve 10 which engages a valve seat on the face of the partition and normally closes the cylindrical passage 7. This valve 10 may be conveniently formed of a washer of leather or rubber having back of the same, a metal disk 11, and this metal disk forms a guiding body which loosely engages the cylindrical lining 5ᵇ of the guiding chamber 5 so as to permit it to slide therein without too great friction, and also to permit the passage of water around the guiding body 11 from one end of the chamber 5 to the other. The valve 10 is also associated with the boss 12 which, when the valve is closed, fits within the cylindrical passage 7, as shown in Figs. 1 and 3 and has the effect of throttling the opening 7 as the valve 10 closes. The pressure chamber is provided with a piston fitting tightly therein and carrying on its rear face a valve 15 which is normally open and which is adapted to engage a valve seat on the side of the partition opposite the inlet valve and close the aperture 7 so as to prevent the passage of water from the inlet chamber to the outlet chamber 3. The piston is provided with a rod or stem 16 which extends through the cylindrical passage or aperture 7, concentrically therewith, and connects the piston and the valves 15 and 10 for joint movement. The stem 16 is preferably screw threaded and screwed into the body of the piston and provided with a set nut 17 for adjusting the piston and valve 15, with respect to the inlet valve 10 to regulate the duration of the secondary flushing action on the movement of the parts in a direction to close the inlet valve. The stem 16 may be formed integral with the guiding body 11 as shown in Fig. 2, and the boss 12 may be conveniently screwed onto a threaded portion of the valve to clamp the washer valve 10 in position. I do not, however, limit myself to this exact construction.

The central cylindrical passage 7 is provided between its ends with an aperture 18 in its side, which communicates with a radially disposed auxiliary outlet passage 19 which may extend outside the casing, or be provided with a tubular extension 20 pressed or screwed into the passage 19, this auxiliary discharge passage being entirely distinct and separate from the main outlet passage 21, and being preferably arranged concentrically therewith, as shown in the accompanying drawings, although this is not essential as it might extend from the valve casing in some other direction, for instance, laterally.

The valve body 1 is provided preferably at one side with an extension 1ª having a vertically disposed passage 22 therein, connected at its upper end by a passage 23 with the inlet chamber 2 and at its lower end by a passage 25 with the outlet chamber 3, the passage 22 being provided at its upper end with a valve seat 25, to receive an auxiliary valve 26 on the end of a valve stem 27 extending longitudinally through the passage 22, and below the passage 23 a passage 28 connects the vertical passage 22 with the outermost end of the pressure chamber on the outer side of the piston, as clearly shown in Figs. 2 and 3. The valve stem 27 passes through a stuffing box, or its equivalent, at the lower end of the passage 22. In this instance, I have shown a leather or rubber washer 29 and metal compressing washer 30 surrounding the valve stem and located at the upper end of a sleeve 31, which is preferably screwed into the lower end of the extension 1ª, although this is not important. A spring 32 surrounds the valve stem between an enlarged head 33 at its outer end and the compressing washer 30, and compresses the washer 29 around the valve stem and also holds the valve 26 in closed position.

The inlet chamber 2 is connected with a water supply when the device is in use and the parts are normally in the position shown in Figs. 1 and 2 of the drawing, so that the inlet valve 10 prevents the passage of water to either the main outlet 21 or the auxiliary outlet 20. If now, the valve stem 33 be moved so as to open the valve 36, water from the main will pass through the passage 23 to the passage 28, and thence to the pressure chamber beyond the piston so as to actuate the piston, which thereupon moves together with the valves 15 and 10 in the direction of the arrow in Fig. 1. The first effect of this movement is to open the cylindrical passage 7 and permit water to flow from the inlet chamber to the auxiliary outlet passage 20 and also to the main outlet passage 21. The continued movement of the piston, however, brings the valve 15 upon its seat and closes communication between the passage 7 and the main outlet 21, but permits a continuous discharge from the auxiliary discharge passage 20 during the entire time that the auxiliary valve 26 remains open, or in other words, it permits a continuous discharge through the auxiliary passage 7 the entire time that the valve 10 is open. Upon the closing of the auxiliary valve 26, the supply of water to the pressure chamber in rear of the piston is discontinued and water accumulates in the chamber 5 behind the guiding part 11 and also acts upon the face of the valve 15 so that the parts commence to move in the return direction opposite to that indicated by the arrow in Fig. 1. As soon as the valve 15 moves away from the partition, the communication between the passage 7 and the main outlet passage 21 is restored, and water is thereafter discharged through the main outlet, while the discharge through the auxiliary outlet still continues, and this situation continues until the inlet valve 10 is again seated upon its seat, when the discharge from both of the outlet passages is cut off, having been previously throttled gradually as the boss 12 enters the passage 7.

The portion of the vertical passage 22 above the horizontal passage 28 is of greater diameter than the portion below the passage 28 so that while the valve 26 is open, the water tends to flow through the upper passage 28. After the valve 26 closes and the return movement of the valve and piston commences, the water in the pressure chamber is expelled and passes back through the passage 28 and thence down through the passage 22 around the valve stem 27 to the passage 24 and thence to the outlet. Obviously, when the valve 26 is open, there may be a slight leakage of water from the passage 22 to the passage 24, but this does not affect the operation of the valve mechanism, as previously described, and is in fact a mere trickle.

To recapitulate the operations, when the auxiliary valve 26 is opened, water is discharged first through both main and auxiliary outlets 21 and 20, until the main outlet is cut off by the closing of the valve 15, the discharge through the auxiliary outlet continuing without interruption; on the closing movement of the inlet valve, the discharge through the main outlet is restored, the discharge through the auxiliary outlet continues, and this situation continues until the inlet valve seats. In practice, I prefer to connect the main outlet 21 to the rim flush of a water closet bowl, and to connect the auxiliary outlet 20 to the jet flush, which discharges through the usual trap, the effect being, under the automatic control of the valve, that when the auxiliary valve 26 is opened, which is usually effected by the depression of the seat through suitable mechanical means, water is at first discharged through both the outlets wetting the walls of the bowl, and emptying the trap; the discharge at the rim through main outlet 21 is then discontinued, while the discharge through the auxiliary outlet 20 to the jet concentrates the full force of the water pressure and discharges an injector stream through the empty trap with the effect of withdrawing large quantities of air and ventilating not only the bowl, but the surrounding room in which it is located, and this condition remains as long as the seat is depressed and the valve 26 held open. On releasing the seat and permitting the valve 26 to close, a flushing action takes place, as before described, water being discharged through both the main and auxiliary passages to the rim and jet, the discharge continuing until it is throttled and shut off by the closing of the inlet valve 10, whereby the liquid seal of the trap is restored. This is my preferred use of the apparatus.

What I claim and desire to secure by Letters Patent is:—

1. In a flushing valve, the combination with the valve casing provided with a partition having a tubular passage extending therethrough, and a valve seat at each end of said passage, said casing being provided with an inlet on one side of said partition, and an auxiliary outlet aperture in the wall of said tubular passage between said valve seats, of a normally closed inlet valve for engaging the valve seat at the inlet end of said passage, a normally open valve for engaging the valve seat at the other end of said passage, and means for simultaneously moving said valves, whereby when the inlet valve is closed no water will pass through the valve casing, when the inlet and outlet valves are open water will pass through the main and auxiliary outlets, and when the outlet valve is closed the discharge from the main outlet will be cut off, while the discharge from the auxiliary outlet will continue.

2. In a flushing valve, the combination with the valve casing provided with a partition having a tubular passage therethrough, and a valve seat at each end of said passage, said casing having an inlet on one side of said partition and a main outlet on the other side, and said passage being provided with an auxiliary outlet independent of said main outlet, and communicating with said passage between the ends thereof, of a normally closed inlet valve for engaging the valve seat at the inlet end of the said passage, a normally open valve for engaging the valve seat at the other end of said passage, and means for effecting the simultaneous movement of said valves.

In testimony whereof I affix my signature, in the presence of two witnesses.

PHILIP HAAS.

Witnesses:
L. E. FELDMAN,
READ M. KUHNS.